May 27, 1941. N. Z. ABRIOL 2,243,367
BOX TRAP
Filed July 10, 1940
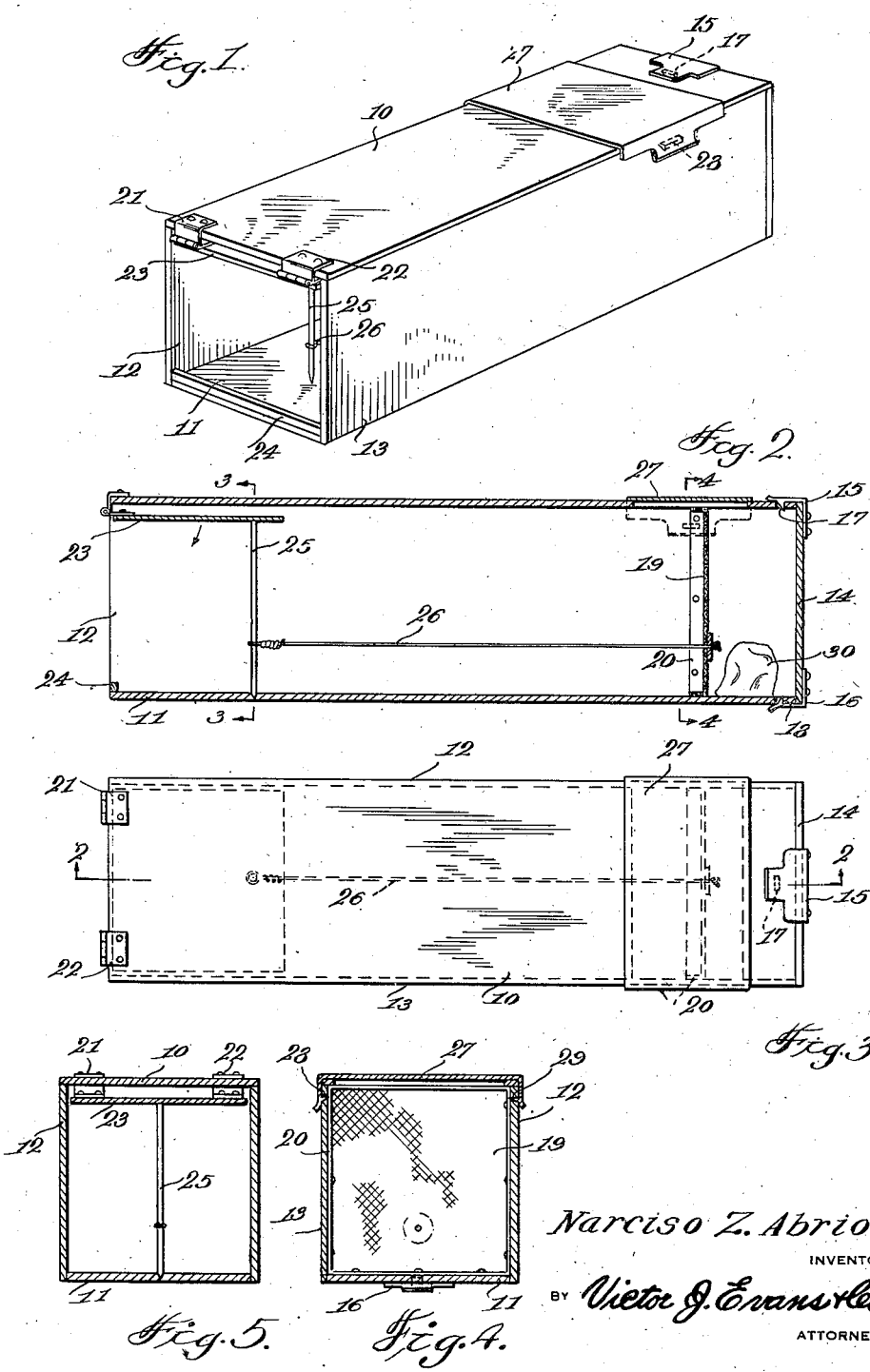
Narciso Z. Abriol
INVENTOR
BY Victor J. Evans & Co.
ATTORNEYS Patented May 27, 1941

2,243,367

UNITED STATES PATENT OFFICE 2,243,367

BOX TRAP

Narciso Z. Abriol, Daet, P. I.

Application July 10, 1940, Serial No. 344,801

2 Claims. (Cl. 43—61)

This invention relates to box traps and has for an object to provide a device of this character having a flexible screen forming the front wall of a bait compartment and connected to a trip cable for releasing the trap door when an animal impinges against the screen while attempting to reach the bait.

Another object of the invention is to provide a trap having a rear end wall and also an inspection plate detachably connected to the trap for replacing the bait or renewing the screen.

A further object is to provide apparatus of this character which will be formed of a few strong, simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a perspective view of a trap constructed in accordance with the invention and shown set.

Figure 2 is a longitudinal section of the trap.

Figure 3 is a top plan of the trap.

Figure 4 is a cross sectional view of the trap looking toward the entrance.

Figure 5 is a cross section of the trap looking toward the screen.

Referring now to the drawing in which like characters of reference designate similar parts in the various views, the trap is shown to comprise a box-like elongated trap body having a top wall 10, a bottom wall 11, and side walls 12 and 13, the body being open at both ends. The rear end of the body is closed by an end wall 14 which is secured to the top and bottom walls 10 and 11 by angular members 15 and 16 formed of resilient sheet material carrying spurs 17 and 18 adapted to pierce the walls 10 and 11. The members 15 and 16 detachably connect the end wall 14 to the body.

A flexible screen 19, within a frame 20 of a size to fit the inner walls of the body, is disposed parallel to the end wall 14 and is spaced therefrom. The screen constitutes a forward wall of the bait compartment, the removable end wall 14 constituting the rear wall of the bait compartment.

Hinges 21 and 22 are mounted on the top wall 10 at the entrance end of the body and have their leaves depending below the top wall 10 to suspend an entrance door 23 between the side walls 12 and 13 in closed position abutting a door stop 24. The door is adapted to swing rearwardly and upwardly to open position adjacent to and parallel with the top wall 10.

A prop 25, pointed at its lower end, rests in a depression in the bottom wall 11. The upper end of the prop engages the door 23, when in open position, to retain the door 23 open. A trip wire 26 is secured to the prop 25 and to the screen 19 to dislodge the prop when an animal impinges against the screen while attempting to reach the bait 30.

An inspection plate 27 is provided with resilient securing prongs 28 and 29 which engage the side walls 12 and 13 and normally close an opening in the top wall 10 of the body. The inspection plate overlies the screen and facilitates removal of the screen and also affords access to the bait compartment for renewing the bait.

In operation the door is held open by the prop 25 and the animal enters the open end of the body seeking the bait 30 within the bait compartment in the rear of the screen 19. The animal pushes against the screen 19 in attempting to reach the bait 30, and causes the screen to yield rearwardly, this movement of the screen being transmitted through the wire 26 to disengage the upper end of the prop 25 from the trap door 23 and permit the door to swing to closed position to abut the door stop 24.

From the above description it is thought that the construction and operation of the invention will be fully understood without further explanation.

Having thus described the present invention what it is desired to secure by Letters Patent is:

1. A trap for animals comprising, an elongated receptacle open at its ends and having an opening in its top wall, a detachably connected end wall closing the rear end of the receptacle and forming the rear wall of a bait compartment, a hinged door hung at the open end of the body adapted to swing inwardly and upwardly toward the top wall of the receptacle, a prop retaining the door in open position, a trip screen remote from the prop forming the front wall of the bait compartment and connected to the prop for dislodging the prop, and a detachably connected inspection plate overlying the screen and affording access to the screen and bait compartment.

2. An animal trap comprising, a body, an end wall detachably connected to the body, an entrance door swingingly mounted at the remote end of the body from the end wall being adapted to swing inwardly and upwardly to open position against the top of the body, a prop retaining the door in open position, a flexible screen wall adjacent the end wall within the body co-acting with the end wall in forming a bait chamber, and a trip wire connected to the screen and to the prop adapted to dislodge the prop when the screen is struck by an animal attempting to enter the bait compartment.

NARCISO Z. ABRIOL.